March 11, 1947.  E. M. MOREHOUSE  2,417,262
SEALING NUT
Filed June 25, 1945

Inventor
EUGENE M. MOREHOUSE
By R. S. Berry
Attorney

Patented Mar. 11, 1947

2,417,262

UNITED STATES PATENT OFFICE 2,417,262

SEALING NUT

Eugene M. Morehouse, Tujunga, Calif., assignor to Adel Precision Products Corp., a corporation of California Application June 25, 1945, Serial No. 601,381

3 Claims. (Cl. 85—36)

This invention has for one of its objects the provision of a nut which is enclosed in a substantially flat, button-like sealing member or jacket of resilient rubber, synthetic rubber or the like and constructed and arranged to form a fluid-tight seal around the screw-receiving opening in a member to which the nut is applied as well as to seal the nut and screw therein against exposure to fluids and substances which would corrode or otherwise damage such parts, thus making the nut well suited to use in tanks and the like, also for electrical connection uses where it is indicated that the nut and portion of the screw therein should be insulated.

Another object of this invention is to provide a jacketed or rubber-covered nut which is small, compact and subject to the same uses as the ordinary nut but with the following advantages:

1. The jacket or covering is yieldable and affords somewhat of a cushioning action.

2. The operator does not have to touch the nut itself and no metal part is exposed in handling and applying the nut unit, thereby avoiding injury of the fingers and scratching of the surface of the member to which the unit is applied.

3. The jacket is constructed in one form of the invention so that the nuts are replaceable, whereby nuts to accommodate screws of different diameters may be applied to a single jacket of given dimensions.

4. The use of a flat resilient sheet metal nut which makes it possible to provide a comparatively small jacket of minimum thickness and thus conserve the jacket material, also reinforces the relatively flexible jacket and lends desired rigidity to the nut without depriving it of the desired yielding and resilient action.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 6 is a sectional view of a modified form of nut unit hereof as applied to hold two members together;

Figure 1:
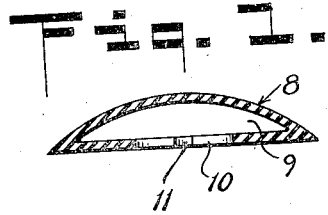
Fig. 1 is a cross sectional view of a nut enclosing jacket of resilient material embodying this invention.
Figure 4:
Fig. 4 is a fragmentary bottom plan view of the nut unit shown in Figs. 1, 2 and 3.
Figure 2:
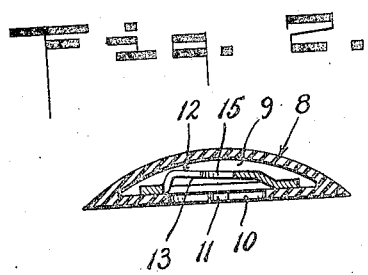
Fig. 2 is a cross sectional view of a jacketed nut made in accordance with this invention.

As shown in Figs. 1, 2, 3 and 4, one embodiment of my invention comprises a button-like jacket of my invention comprises a button-like jacket member 8 formed of yieldable, elastic and resilient material such as rubber or synthetic rubber and hollowed out to provide a nut-receiving pocket 9 access to which is had through an opening 10 and short slots or notches 11 extending from opposite sides of said opening in the bottom wall of the jacket.

In the present instance the jacket is circular and flat on its inner side and convex and rounded on its outer side. The pocket 9 is substantially rectangular and centered in the jacket for reception of a rectangular sheet metal nut 12. This nut may be inserted into the pocket by being forced through the opening 10 and slots 11. The jacket material adjacent the opening 10 will stretch to allow the nut to be inserted and will then spring back into position to enclose and securely hold the nut in place.

It is to be understood that the jacket and nut need not be circular and rectangular respectively and can be of any shape provided they make possible the construction and functions herein set forth.

Figure 3:
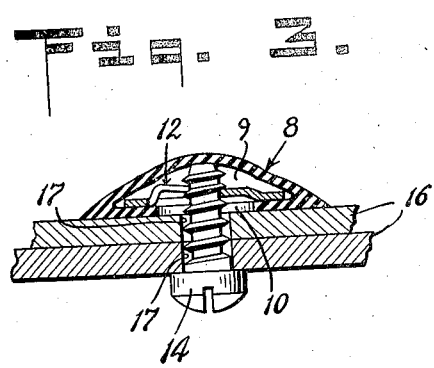
Fig. 3 is a sectional view similar to Fig. 2 showing one manner of use of the nut.
Figure 8:
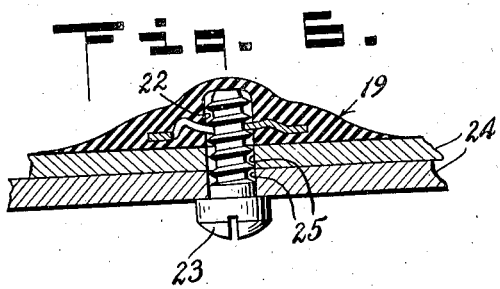

The nut 12 as here shown is formed of a plate-like piece of resilient sheet metal having side-by-side elongated bridge portions 13 struck out therefrom and arranged to resiliently grip and have screw-threaded engagement with a screw 14 as shown in Fig. 3, there being a screw-receiving opening 15 in opposed edges of the bridge portions through which the screw is turned. This opening registers with the opening 10 in the bottom wall of the jacket which latter opening is of less diameter than the length and width of the nut.

Fig. 3 shows one application of the nut unit hereof wherein two members 15 are secured to one another by means of the unit and the screw 14 passed through registering openings 17 in said members and turned in threaded engagement the nut 12. As the screw is tightened the jacket is distorted and the bottom wall thereof is compressed between the nut 12 and the adjacent member 16 and forms an annular fluid-tight seal around the screw and the opening in said adjacent member. The marginal portions of the jacket in being relatively thin and projecting outwardly from the margin of the nut will yield readily to assure a good sealing action. The outer wall of the jacket will yield outwardly if the screw is brought into contact therewith as shown in Fig. 3, but will be covered by the jacket as the screw is of a selected length so that it will not pierce the jacket.

In addition to forming a seal around the screw and the screw opening in the adjacent member 15, the jacket acts as a yieldable and vibration-absorbing cushion, also insulates and encloses the nut and that portion of the screw extending through the nut. The smooth convex outer surface of the jacketed nut projects but slightly from the member on which it is seated and no metal parts or other parts of the unit are exposed or become obstructions. The resilient locking action of the nut 12 assures a tight connection of the screw and nut preventing loosening thereof.

Figure 7:
Fig. 7 is a top plan view of the nut unit and assembly as shown in Fig. 6.
Figure 5:
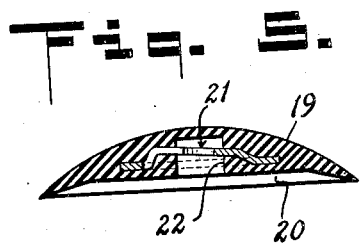
Fig. 5 is a cross sectional view of a modified form of the nut unit.

As shown in Figs. 5, 6 and 7, a modified form of the jacketed nut hereof comprises a circular button-like member or jacket 19 of resilient rubber or the like and of substantially the same shape as the jacket 8 except that it is formed with a concaved underside 20. In this form of the invention a nut 21 identical with the nut 12 is embedded tightly in the jacket by molding the jacket around the nut, there being an axial screw-receiving opening 22 in the molded jacket member extending but part way therethrough whereby a screw 23 may be turned in the nut as shown in Figs. 6 and 7 to secure members 24 together.

In applying the nut unit shown in Figs. 5, 6 and 7, it is placed with its concaved underside against one of the members 24 in position to align the opening 22 with screw-receiving openings 25 in the members 24. This form of nut unit has all of the other functions and advantages of the first described nut unit except the provision for replacing the nut.

It should be noted that while I have shown a flat sheet metal nut in the several forms of nut units hereof, other types of nuts may be used if desired.

In this connection it should be noted that in both forms of the invention the jackets taper from the thicker central portions thereof to comparatively thin marginal portions projecting beyond the nut and which make the jackets quite flexible whereby said margins will be readily compressed to form a fluid-tight seal.

It will now be apparent that I have provided as a new article of manufacture, a cushioned and insulated sealing nut which is inexpensive, small, compact and constructed and arranged to make it subject to many applications and uses where an ordinary uncovered metal nut would not be desirable, if not prohibitive, especially in tanks for fluid which would corrode or ill effect an uncovered nut and screw and where a cushioning and yielding contact of the nut unit is desired or where electrical connections are to be made and insulation of the nut is preferable, as well as at any place where it is desired to provide a fluid-tight seal around the screw and nut and screw opening in the member to which the nut unit is applied.

While I have shown and described specific embodiments of my invention, I do not limit myself to the exact details of construction set forth, and the invention embraces such changes, modifications and equivalents of the parts and their formation and arrangement as come within the purview of the appended claims.

I claim:

1. In a sealing nut, a button-like member of yieldable and resilient material such as rubber or the like axially dimensioned so that the marginal portions thereof are relatively thin and flexible, and a nut enclosed within said member, there being a screw-receiving opening extending into said member whereby a screw may be turned therein to threadedly engage said nut, said button-like member having a pocket therein for reception of the nut whereby the nut is replaceable.

2. In a sealing nut which includes a rigid nut held within a button-like jacket member formed of elastic and yieldable material such as rubber or the like, the improvement which includes an axial dimensioning of said jacket member so that it is of greater overall thickness intermediate margins thereof and has relatively thin and flexible marginal portions extending outwardly from the margins of the nut, there being an opening extending into said member affording the threaded application of a screw to said nut, said marginal portions disposed to form a seal around the screw on an object through which the screw is applied to the nut, said jacket member being imperforate on its outer surface and operating to cover the nut and screw.

3. A sealing means for a sheet metal nut comprising a button-like member of yieldable and resilient material such as rubber or the like axially dimensioned so that the marginal portions thereof are relatively thin and flexible, said member having a cavity therein adapted to embrace and retain said nut, said cavity having an opening to an exterior surface of said member through which opening said sheet metal nut may be inserted in said cavity said opening serving additionally as a means of access for a screw threaded element for engagement with the thread-engaging surface of said nut, the opposite surface of said member being imperforate and being effective to serve as a cover and seal for a nut and screw associated therewith.

EUGENE M. MOREHOUSE.

REFERENCES CITED

The following references are of record in the file of this patent:

UNITED STATES PATENTS

| Number | Name | Date |
|---|---|---|
| 2,055,397 | Zaiger | Sept. 22, 1936 |
| 2,370,799 | Kelley | Mar. 6, 1945 |